Sept. 24, 1929.  N. SIDDALL  1,729,017
DRINKING VESSEL
Filed Feb. 24, 1928
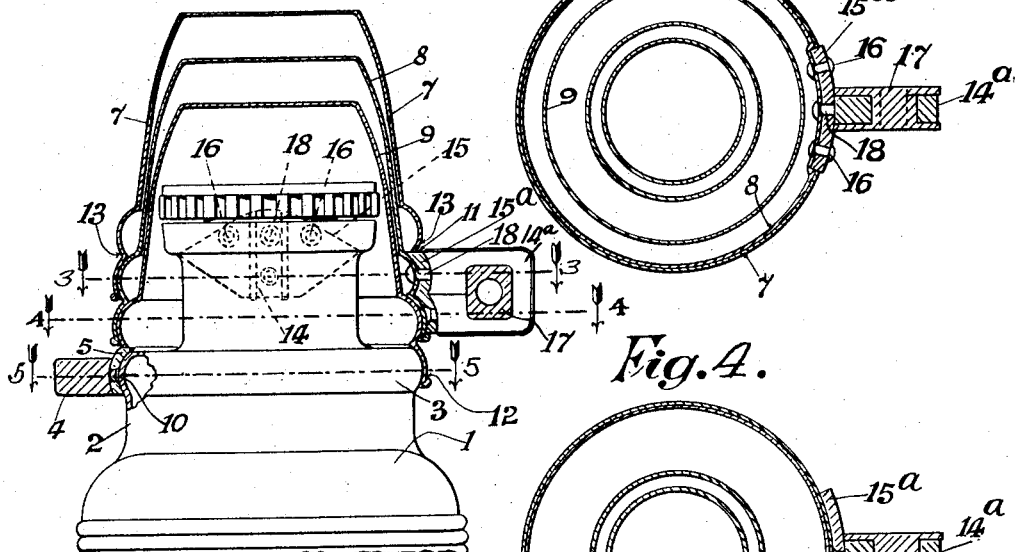
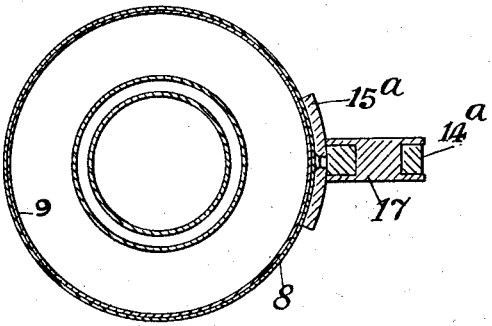
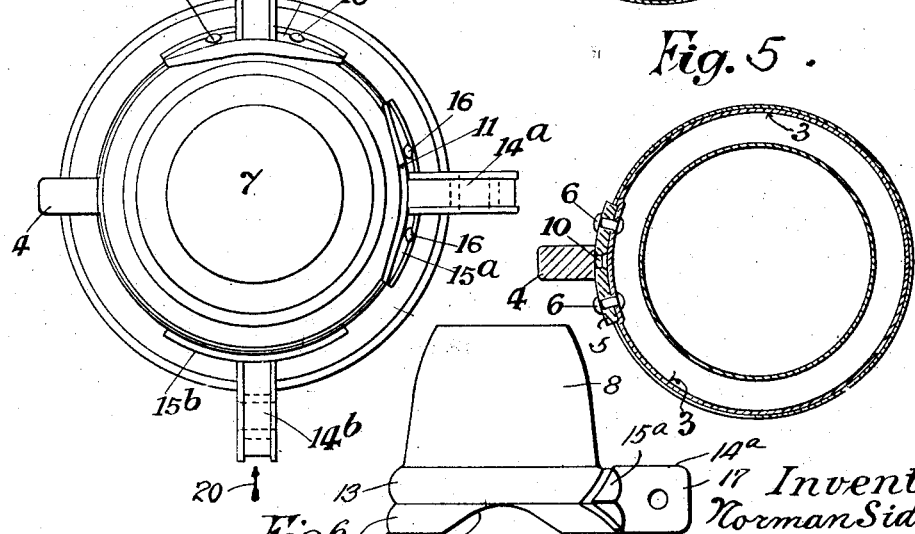
Inventor.
Norman Siddall.
per Ferdinand Broker Bosshardt
Attorney.

Patented Sept. 24, 1929

1,729,017

UNITED STATES PATENT OFFICE

NORMAN SIDDALL, OF STOCKPORT, ENGLAND

DRINKING VESSEL

Application filed February 24, 1928, Serial No. 256,756, and in Great Britain March 3, 1927.

This invention relates to drinking vessels which are provided on vacuum flasks and have open tops which are usually of small diameter, but may be of larger diameter, dependent on the size of the vacuum flask, and to the adaption of such vacuum flasks to combine them with drinking vessels in accordance with my invention.

The object of my invention is to enable a plurality of equal sized drinking vessels to be conveniently and compactly provided on a vacuum flask.

I attain this object by the means hereinafter described with reference to the accompanying drawings and hereinafter claimed.

In the accompanying drawings—

Figure 1 is a view, partly in section of drinking vessels provided on the upper part of a vacuum flask.

Figure 2 is a plan view thereof.

Figures 3, 4 and 5 are detached cross-sections on lines corresponding with the lines 3—3, 4—4 and 5—5 respectively of Figure 1.

Figure 6 is a detached view of one of the drinking vessels.

Referring to the drawings, the metal casing 1 of a vacuum flask is provided with a neck 2 having an annular swell 3, a projecting finger piece 4 and a segmental upward projection 5 the projecting finger piece 4 preferably being secured to the projection 5 by a rivet 10. The projection 5 may be attached to the swell 3 by rivet means 6.

One or more, for example three identical metal drinking vessels 7, 8 and 9 are provided. As all three vessels are identical, the form of one only, namely the vessel 8 will be described. This vessel is separately illustrated in Figure 6 and the vessel being shown as it would be seen when regarded in the direction of the arrow 20, Figure 2. The vessel 8 has a substantially arcuate gap 11 extending from the rim thereof and therefore interrupting or breaking away a portion of the rim. The remaining portion of the rim is provided with an inwardly directed flange 12 or bead obtained by forming the vessel with an annular corrugation. The vessel 8 is furthermore provided at a suitable distance away from its rim with an annular shoulder 13 or bead which bulges or projects outwardly and is obtained by forming the vessel with a second annular corrugation. The drinking vessel 8 is furthermore provided with a handle 14$^a$ riveted by a rivet 18 to the annular shoulder 13 and by a segmental plate 15$^a$ which is also riveted to the shoulder 13 by rivets 16 and extends nearly to the rim of the vessel. The plate 15$^a$ therefore constitutes a thickened part of the vessel where the handle is situated. The gap and handle of the vessel 8 are so relatively situated that when the vessel is held by the handle 14$^a$ in the act of drinking, the gap 11 registers with the nose of the drinker. The handle is preferably provided with a heat-insulating part 17.

The handle indicated for the sake of distinction by 14 belongs to the vessel 7 the gap of which coincides with the handle marked 14$^a$ which belongs to the vessel 8 which has its gap 11 coincident with the handle 14$^b$ belonging to the vessel 9 which has its gap coincident with the finger piece 4. Although for the sake of distinction two of the handles are indicated by 14 and 14$^b$ respectively it is to be understood that they are identical in construction with the handle 14$^a$. The vessel 7 has a plate 15 and the vessel 9 a plate 15$^b$ which are identical in construction and method of attachment with the plate 15$^a$.

Owing to the provision of the gap 11 or interruption in the rim of each vessel, the rim is capable of expanding and any one of the vessels, for example 9, can therefore be sprung onto the swell 3 of the neck 2 until its inwardly directed flange or bead grips the swell 3 of the neck. The gap 11 in the said vessel 9 is filled by the upward projection 5 on the swell 3. By pinching the finger piece and the handle 14$^b$ of the vessel between the thumb and finger, the vessel 9 is caused to rotate on the swell 3 and its gap to ride up the projection 5 on the swell 3, thereby springing the flange 12 or bead off the swell 3 and thus releasing the vessel 9 from the neck 2. Another of the vessels, for example 8 may be sprung onto the vessel 9, the inwardly directed flange 12 or bead of 8 engaging the annular projection 13 of vessel 9 and the plate 15$^b$ of the vessel 9 filling the gap in the vessel 8. By pinching the handles 14ᵃ and 14ᵇ of the vessels 8 and 9 together the vessel 8 is forced off the vessel 9 in the hereinbefore described manner. The flange 12 of the vessel 7 is sprung onto the shoulder 13 of the vessel 8 with the plate 15ᵃ of the vessel 8 filling the gap 11 of the vessel 7 and by pinching the handles 14 and 14ᵃ together the vessel 7 is forced off the vessel 8 in the hereinbefore described manner. Any desired number of further vessels may be placed on the third vessel to form a nest of vessels with the handles thereof successively displaced ninety degrees.

In another construction the first vessel may be formed substantially as hereinbefore described with reference to the first construction but have an outwardly directed flange or bead at the interrupted part of its rim instead of an annular shoulder at a distance from its rim and a second vessel be of similar form but of increased size so as to be connectible to the first vessel by springing the internal flange or bead thereof over the outwardly directed flange or bead of the first vessel.

It is to be understood that I may provide one vessel only, attached in accordance with my invention to the metal casing of the vacuum flask.

Although the interruption in the rim of the drinking vessel has been illustrated as a substantially arcuate gap, it is to be understood that alternatively the rim may be interrupted by being split at one or more places or by any other suitable device which will enable it to be sprung over the part provided to engage therewith.

I claim—

1. In a drinking vessel for attachment to a vacuum flask, an interruption in the continuity of the rim of the vessel, an internal annular shoulder on the vessel interrupted by the said interruption, and an external uninterrupted annular shoulder on the vessel, in combination with an external shoulder on the said flask adapted to be yieldingly engaged by the internal annular shoulder on the vessel.

2. In drinking vessels for atachment to a vacuum flask, a concave gap in the rim of each drinking vessel, an external annular shoulder on each drinking vessel, an internal shoulder on each drinking vessel interrupted by the said gap and engageable with the external annular shoulder of another of the said drinking vessels, whereby one drinking vessel can be sprung onto and off another drinking vessel.

3. In a drinking vessel for attachment to a vacuum flask, a concave gap in the continuity of the rim thereof, and an annular internal shoulder thereon interrupted by the said gap, in combination with an annular swell on the vacuum flask yieldingly engaged by the said internal shoulder, a thickened part on the said swell filling the gap in the drinking vessel and a finger piece provided on the swell at the thickened part thereof.

4. In drinking vessels for attachment to a vacuum flask, a concave gap in the annular rim of each drinking vessel, springy engaging means on each vessel which disconnectibly attach one vessel to another, a thickened part on each drinking vessel which fills the gap in another of the said drinking vessels and a handle provided on the said thickened part, the edge of the gap of one drinking vessel cooperating with an edge of the thickened part of another drinking vessel to separate and thereby disconnect the drinking vessels from each other.

In testimony whereof, I have signed my name to this specification at Manchester in the county of Lancaster, England, this 8th day of February, 1928.

NORMAN SIDDALL.